Aug. 3, 1965  C. A. RAMSEL ETAL  3,198,027
HYDRAULIC TRANSMISSION CONTROL
Filed Nov. 6, 1961                                    3 Sheets-Sheet 3
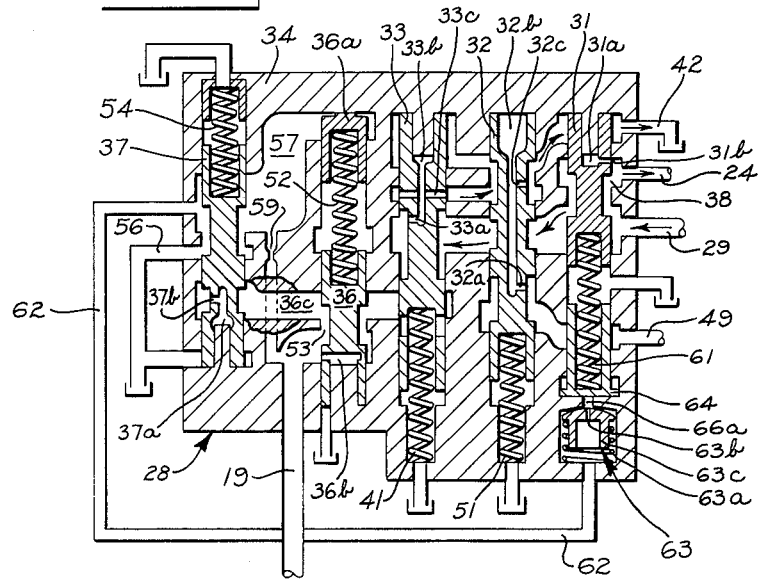
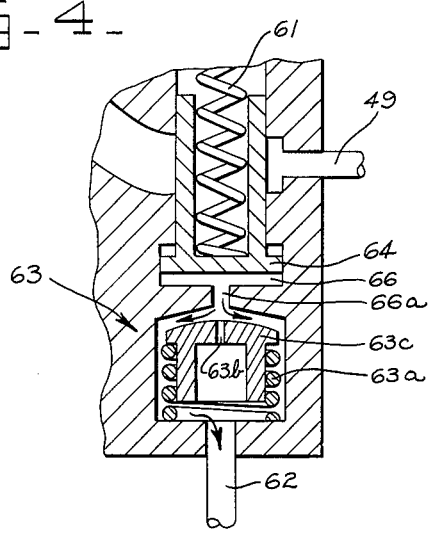
INVENTORS.
CHARLES A. RAMSEL
BY GERALD D. ROHWEDER
ATTORNEYS

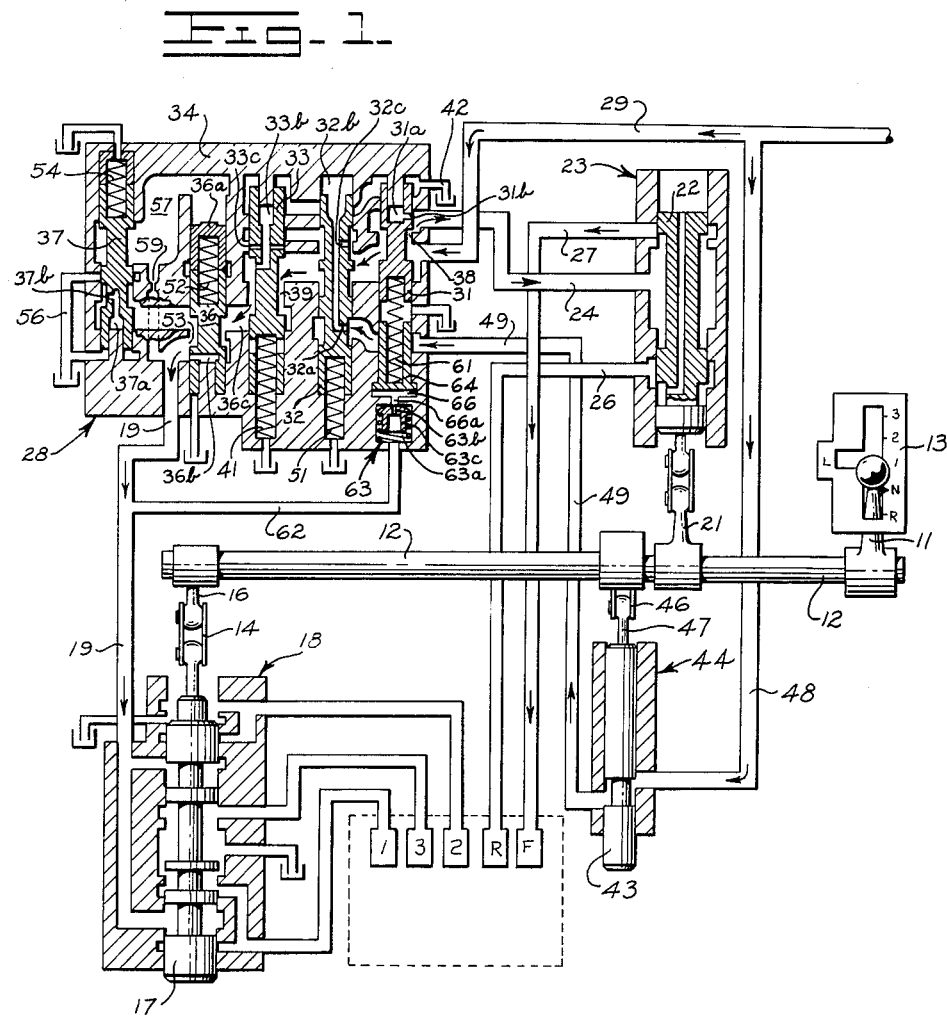

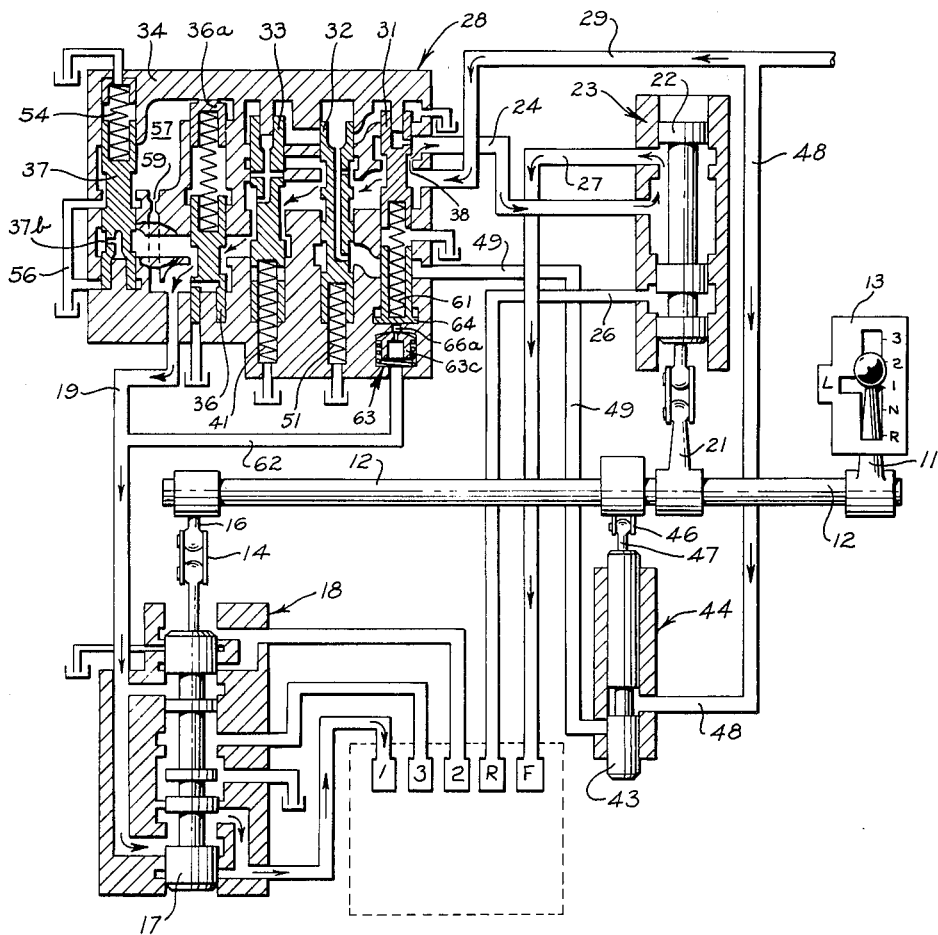

United States Patent Office 3,198,027
Patented Aug. 3, 1965

3,198,027
HYDRAULIC TRANSMISSION CONTROL
Charles A. Ramsel and Gerald D. Rohweder, Peoria, Ill., assignors to Caterpillar Tractor Co., Peoria, Ill., a corporation of California
Filed Nov. 6, 1961, Ser. No. 150,241
4 Claims. (Cl. 74—364)

The present invention relates to hydraulic operating controls for transmissions, and more particularly to hydraulic transmission controls providing modulation for directional clutches.

It is not uncommon for motor vehicles which are operated in soft dirt, mud, snow or any other medium in which it is possible for the wheels to sink to become bogged down due to an inability of the power plant to lift the vehicle out. A technique used for extricating a vehicle in such a situation involves quickly shifting the transmission of the vehicle from first gear forward to first gear reverse in repetitive sequence to utilize the weight of the vehicle, through inertia, as well as the power plant. The use of this "rocking" technique has been found, especially when applied to heavy construction vehicles, to create sudden stresses or shocks which are capable of producing severe damage thereto. Thus it is highly desirable to provide a vehicle with a transmission which allows the use of the "rocking" technique with included means for preventing any damage to the transmission of the vehicle as a result.

Accordingly, it is an object of the present invention to provide a hydraulic modulating system for the directional clutches of a transmission, which allows the transmission to be repetitively shifted from forward to reverse without damaging the transmission.

Further and more specific objects and advantages of the invention will be made apparent in the following specification wherein reference is made to the accompanying drawings.

In the drawings:

FIG. 1 is a schematic circuit illustration of hydraulic controls embodying the present invention, the positions of the parts representing a neutral condition;

FIG. 2 is a view similar to FIG. 1 but showing the position of the parts assumed when the transmission is in a forward gear (first gear forward) and prior to any pressure modulation;

FIG. 3 is a schematic circuit diagram of a portion of the circuit illustrated in FIG. 1 having a modified control circuit wherein the various components are shown in the position assumed when the engine is in a shutdown condition; and FIG. 4 is a fragmentary view of the hydraulic circuit illustrating the operation of a poppet valve.

Referring to FIG. 1, there is shown a gear shift lever 11 mounted on a shaft 12 and adapted to be pivoted in any one of several selected speed and directional shift positions indicated by the scale 13. As the shaft 12 turns during shifting operation, a linkage 14 pivotally connected to an arm 16 on the shaft 12 positions a spool 17 of a transmission speed range control valve 18 to direct hydraulic fluid from a line 19 to the selected one of three speed range hydraulic clutches 1, 2 and 3, shown schematically in the drawings.

Another arm 21 on the shaft 12 pivots with the gear shift lever 11 to move a spool 22 of a directional control valve 23 to direct flow of hydraulic fluid from a line 24 to conduit 26 when the lever is in reverse position, and line 27 in all other positions.

A transmission pressure control valve unit 28 is interposed between a hydraulic line 29 from a source of hydraulic fluid (not shown) and line 19 to speed range control valve 18. Control valve unit 28 includes a pressure reducing valve 31 which controls the fluid in line 29 at a reduced pressure to the directional selection valve 23 for actuation of the forward or reverse clutch. Fluid from line 29 is also directed to a safety valve 32 and a preference or sequence valve 33 in the valve body 34. The control valve unit 28 also includes a pressure reducing valve 36 and a check valve 37. The manner in which control unit 28 operates in modulating the flow of hydraulic fluid to speed selector valve 18 is described in detail in Patent No. 3,096,667 of Dickeson et al., entitled "Transmission System and Hydraulic Controls Therefor." The general operation of control unit 28 will be described herein, however, to provide a better understanding of the manner in which the present invention provides modulation of the hydraulic fluid to directional control valve 23.

Referring to FIG. 3, the various valves of control unit 28 are shown in the position assumed when the engine is not operating and the only forces are those supplied by the springs associated with each valve, it being understood that fluid under pressure for shifting the vehicle transmission is provided by a pump driven by the engine of the same vehicle. When the engine is started hydraulic fluid flows in line 29 and passes through pressure reducing orifice 38 to line 24 which delivers the hydraulic fluid to directional control valve 23. The hydraulic fluid entering through conduit 29 will also flow around safety valve 32 to sequence valve 33 which blocks further flow at the port 39. A single radial passage 33a permits hydraulic fluid to enter the chamber 33b wherein hydraulic fluid normally acts against valve spring 41. However, a plurality of radial ports 33c permit fluid to flow out of the chamber 33b faster than it flows in while safety valve 32 is in its upper position which allows the fluid flowing from ports 33c to flow freely to a dump line 42. Thus safety valve 32 prevents the hydraulic fluid in chamber 33b from positioning sequence valve 33 to allow the hydraulic fluid at port 39 to enter the speed control valve 18 (FIG. 1) through conduit 19. The condition described with reference to FIG. 3 is maintained until control lever 11 is positioned to neutral.

As best seen in FIG. 1, in the neutral position shaft 12, which is connected to member 43 of a safety reset valve 44 through linkage 46 and valve arm 47, rotates to position member 43 to allow fluid flow through the valve 44. Thus fluid flowing through conduit 48 passes through valve 44 where it enters conduit 49 communicating with control valve 28. The fluid entering valve 28 from conduit 49 passes through a lower port 32a in safety valve 32 allowing hydraulic pressure to build up in chamber 32b (flow out of an upper orifice 32c is less than the flow in through port 32a) which opposes safety valve spring 51 moving the valve to the position shown in FIG. 1. In its downward position safety valve 32 prevents fluid flow from ports 33c of sequence valve 33 from passing to drain outlet 42. Pressure in chamber 33b is thereby able to build up and oppose spring 41 and move valve 33 downward to the position shown in FIG. 1. The downward movement of the valve 33 establishes communication between the hydraulic fluid entering through conduit 29 and conduit 19 to feed control valve 18. As control valve 18 fills, fluid pressure builds up in conduit 19 which induces a pressure build up in chamber 36b opposing valve spring 52 thereby reducing orifice 53 which causes a pressure rise in passage 36c. Rise of pressure in chamber 37a which is connected to passage 36c through port 37b acts against spring 54 to move check valve 37 to its upward position closing off communication between chamber 57 and drain line 56. Fluid flowing from line 19 through orifice 59 into chamber 57 acts on load piston 36a urging it downwardly from the position shown in FIG. 3 which increases the force against spring 52 and tends to increase the size of orifice 53, thereby reducing the amount of restriction and allowing an increase in pressure in line 19. When, however, a sudden drop in pressure occurs in conduit 19 and passage 36c, as when one of the speed clutches is filling in response to a gear shift, check valve 37 moves to the position shown in FIG. 3 allowing the fluid in chamber 57 to drain quickly through drain line 56 allowing load piston 36a to move upwardly which unloads spring 52 thereby positioning valve 36 for another modulating cycle.

Control unit 28 thus requires that the gear shift be positioned to neutral before hydraulic fluid can be admitted to the speed clutches by a proper shift. The safety valve 32 remains open (allows fluid to enter conduit 19) when there is a shift from one gear to another by fluid from conduit 29 entering orifice 32c in valve 32 and thereby maintaining the pressure in chamber 32b even after fluid in conduit 49 no longer flows due to valve 44 closing. Thus unit 28 is effective in requiring a shift to neutral to initiate operation, and thereafter modulates the hydraulic fluid to the speed clutches to insure smooth vehicle operation. The present invention enlarges the operating scope of unit 28 by providing means for controlling the pressure of the hydraulic fluid to the directional clutches as well as the speed clutches and thereby allow the "rocking" technique to be employed without damage to the transmission.

Referring again to FIG. 1, the operation of the hydraulic control system in filling one of the directional clutches includes fluid passing from conduit 29 past orifice 38 where pressure is reduced before the fluid is admitted to conduit 24. Conduit 24 leads the fluid through control valve 23 which directs the incoming fluid to either one of the forward or reverse directional clutches; FIG. 2 illustrating the action when the forward clutch is being filled. As the clutch is being initially filled, there is little or no pressure build up in conduit 24 so that orifice 38 is generally in an open position as illustrated in FIG. 3. As the clutch fills, however, pressure builds up in conduit 24 and causes hydraulic fluid pressure to rise in chamber 31a (formed by a central bore in valve 31) through passage 31b. The hydraulic fluid in chamber 31a urges the valve 31 against its spring 61 and at the same time causes a greater pressure drop across orifice 38 by reducing the size thereof. An equilibrium position is generally attained wherein the hydraulic fluid in chamber 31a counteracts the spring force of spring 61 and orifice 38 is thereby positioned to cause a pressure drop which is just sufficient to maintain a constant pressure in a directional clutch until modulation of a speed clutch begins.

When one of the speed ranges is selected the fluid will be admitted through conduit 19 to one of the speed clutches as shown in FIG. 2. A conduit 62 connects conduit 19 to a poppet valve 63 which communicates with a piston 64 located below valve 31. Between poppet valve 63 and piston 64 is a chamber 66 (FIG. 1) which receives fluid through the poppet valve from supply line 19 via conduit 62. When the fluid pressure in chamber 66 is less than the fluid pressure in conduit 62 poppet valve 63 assumes the position shown in FIG. 1 in response to poppet valve spring 63a. In the position shown in FIG. 1 fluid in conduit 62 enters chamber 66 through small orifice 63b in poppet valve member 63c. The rate at which fluid enters chamber 66 is thus controlled by the size of orifice 63b. When, however, the pressure in conduit 62 is less than the pressure in chamber 66 by an amount sufficient to counteract valve spring 63a the poppet valve assumes the position shown in FIG. 4. The pressure in chamber 66 forces poppet valve member 63c down against its spring 63a allowing fluid to pass from chamber 66 through port 66a which is considerably larger than orifice 63b of the poppet valve. Thus poppet valve 63 provides controlled filling of chamber 66 and the ability to allow fluid to exit therefrom at a much greater rate.

Thus when one of the speed clutches fills and pressure builds up in conduit 19 fluid will pass through conduit 62 to poppet valve 63. As the fluid passes through orifice 63b thereof it exerts pressure on the piston 64 which will urge it upwardly against the force of spring 61. Increasing compression of spring 61 disturbs the previous equilibrium between the pressure in chamber 31a and the spring. This requires a greater pressure in chamber 31a to counteract spring 61 and therefore requires greater pressure in conduit 24 which corresponds to a greater pressure in clutch F. Since the pressure in conduit 19 is modulated by the action of valve 36 in control unit 28, the pressure against piston 64 will likewise be modulated, causing modulation of the directional clutches. It is to be noted that the modulation of the directional clutches is determined by the pressure in the speed clutches and the modulation thereof. Thus, a functional relationship exists between the modulation of the pressure in the speed clutches and the modulation of the pressure to the directional clutches to insure smooth operation. When a change in gear is demanded by a shift of gear lever 11, pressure will drop in conduit 19 causing poppet valve 63 to move downwardly and release the fluid in chamber 66. As the pressure builds up in conduit 19, pressure also builds up in chamber 66, again causing the modulation cycle to begin.

It can be seen that as the transmission is shifted from first forward to reverse, pressure will drop in chamber 57 due to the filling of one of the directional clutches from conduit 29, causing a drop in pressure in conduit 19 at the same time. A pressure drop in chamber 57 is effective in allowing piston 36a to move upwardly to the position corresponding to the beginning of the speed clutch modulation cycle and a drop in pressure in conduit 19 returns piston 64 of valve 31 to the position which corresponds to the beginning of the directional clutch modulation cycle. After filling the directional clutch and the speed clutch the pressure rises in conduit 19 starting the two modulating cycles. Thus the "rocking" technique can be used to its fullest advantage without setting up dangerous, and possibly damaging, force.

FIG. 3 illustrates a variation in the manner in which piston 64 receives modulating fluid pressure. Input line 62 communicates with chamber 57 rather than conduit 19. This gives a modulation rate to the directional clutches which is dependent upon the size of orifice 59 as well as orifice 63b of poppet valve 63. This embodiment also makes possible directional clutch modulation without the use of poppet valve 63. If conduit 62 communicates directly with port 66a of chamber 66, then a modulation cycle is established and controlled by orifice 59, check valve 37 and orifice 53.

What is claimed is:

1. In a transmission hydraulic control system including modulated fluid under pressure delivered to a speed clutch system the combination comprising a valve housing, a valve spool slidably residing in said housing and forming an orifice therewith, the fluid under pressure communicating with one side of said orifice, a directional clutch system communicating with the other side of said orifice, movement of said spool relative to said housing varying the area of said orifice, a piston adjacent one end of said spool and slidably maintained in a piston chamber in said housing, said spool having a central bore in its other end, said bore communicating with the side of said orifice which communicates with said directional clutch system whereby fluid entering said bore induces movement of said spool relative to said housing, a valve spring opposing the motion induced by fluid in said bore, a poppet valve communicating with said piston chamber, said modulated fluid communicating with said poppet valve whereby fluid enters said piston chamber and induces movement of said valve spool in opposition to the movement induced by the pressure in said bore, movement by pressure in said bore operative to reduce the area of said orifice while movement in opposition thereto is operative to increase the area of said orifice.

2. In a transmission hydraulic control system wherein a speed clutch system is disposed to receive modulated, hydraulic working fluid, the combination comprising;

hydraulic valve means disposed to receive hydraulic working fluid, said valve means having a fluid output wherein the pressure of the fluid at the output is variable over a given range;

a directional clutch system hydraulically disposed to communicate with the output of said valve means; and means associated with said valve means for varying the pressure of the fluid at said valve means output, said means operable to vary the pressure at said valve means output as a function of the pressure in the speed clutch system.

3. The control system of claim 2 further comprising an orifice in said valve means disposed between the hydraulic working fluid received by said valve means and the output thereof, and means operable to vary the area of said orifice whereby the pressure at said valve means output is varied.

4. The control system of claim 3 further including a poppet valve means hydraulically disposed between said last named means and the speed clutch system whereby increases in pressure in the speed clutch system have a delayed effect on said directional clutch system and decreases in pressure in the speed clutch system are reflected without delay in said directional clutch system.

References Cited by the Examiner

UNITED STATES PATENTS

| | | |
|---|---|---|
| 2,721,640 | 10/55 | De Feo et al. |
| 2,807,968 | 10/57 | Forster. |
| 2,833,162 | 5/58 | Forster. |
| 2,893,261 | 7/59 | Flinn _____ 74—472 |
| 2,943,500 | 7/60 | Wittren. |
| 3,019,668 | 2/62 | Winchell et al. |

DON A. WAITE, *Primary Examiner.*